United States Patent [19]

Craft

[11] Patent Number: 5,505,102
[45] Date of Patent: Apr. 9, 1996

[54] IDLER GEAR MOUNTING ARRANGEMENT

[75] Inventor: Robert B. Craft, Ceresco, Mich.

[73] Assignee: Eaton Corporation, Cleveland, Ohio

[21] Appl. No.: 157,488

[22] Filed: Nov. 23, 1993

[51] Int. Cl.$^6$ .............................. F16H 57/04; F16H 3/08
[52] U.S. Cl. ................................................ 74/467; 74/331
[58] Field of Search .............................. 74/331, 467, 325

[56] References Cited

U.S. PATENT DOCUMENTS

| | | | |
|---|---|---|---|
| 4,041,791 | 8/1977 | Coy | 74/325 |
| 4,735,109 | 4/1988 | Richards et al. | 74/745 |
| 4,765,197 | 8/1988 | Yarnell | 74/467 |
| 4,793,200 | 12/1988 | McDonald | 74/331 |
| 5,228,355 | 7/1993 | Smith et al. | 74/467 |

*Primary Examiner*—Charles A. Marmor
*Assistant Examiner*—Sherry Estremsky
*Attorney, Agent, or Firm*—L. J. Kasper; Howard D. Gordon

[57] ABSTRACT

A gear mounting for use in a compound change gear transmission (10) having an intermediate wall portion (50), and a shaft support portion (66) axially spaced from the intermediate wall portion (50). Disposed axially between the intermediate wall portion and the shaft support portion is a gear member (48). The intermediate wall portion and shaft support portions define aligned shaft bores (92,96) with the shaft member (98) disposed therein, and including retention means (122) to retain the shaft member within the bores. The shaft member defines lubricant passage means (100) permitting flow of lubrication fluid through the shaft and into a set of bearings (64) which receive the forward end of an adjacent countershaft (60). The outer surface of the shaft member (98) defines an inner race for a set of bearings (120) disposed between the shaft and the gear member (48). The disclosed mounting arrangement substantially simplifies and strengthens the mounting of the gear member (48).

13 Claims, 3 Drawing Sheets

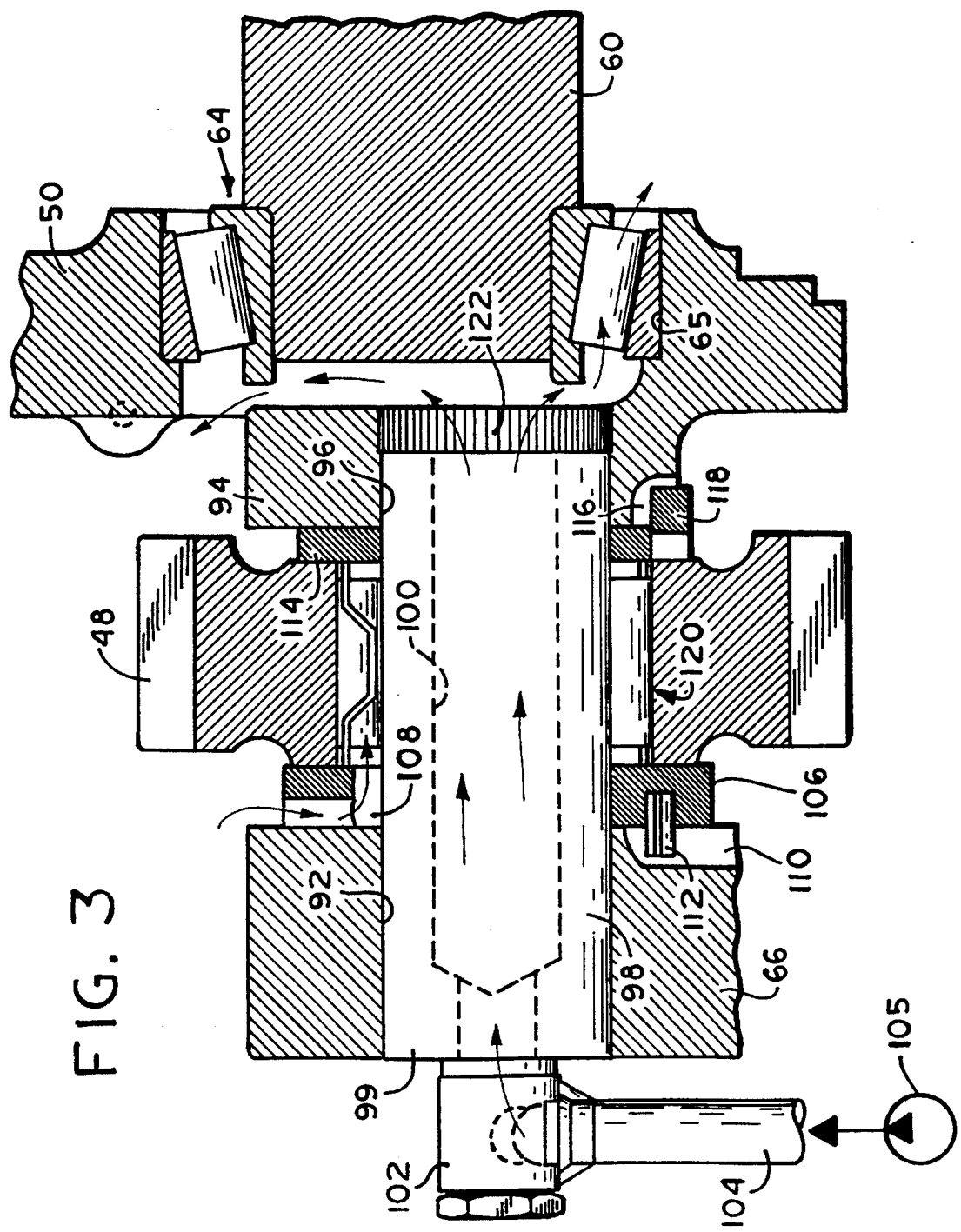

IDLER GEAR MOUNTING ARRANGEMENT

BACKGROUND OF THE DISCLOSURE

The invention relates to gear-type devices such as compound change gear transmissions, and more particularly, to improved mounting means for gears, for use in such gear devices.

Although the present invention may be used in various types of gear devices, it is especially advantageous when used in a compound change gear transmission of the type comprising a main transmission section connected in series with an auxiliary transmission section, and will be described in connection therewith.

In compound change gear transmissions of the type described above, each of the main and auxiliary transmission sections typically includes a mainshaft and one or more countershafts, and most of the gears included in the transmission surround or are mounted on one of the mainshafts or one of the countershafts. See, for example, U.S. Pat. No. 4,703,667, assigned to the assignee of the present invention and incorporated herein by reference.

In a typical compound change gear transmission of the type described above, and by way of example only, it is necessary to provide an idler gear in meshing engagement with both the countershaft (or a gear mounted thereon), and the reverse gear mounted on the mainshaft. Thus, the idler is typically referred to as the "reverse idler gear", and is mounted on a reverse idler shaft, separate from the mainshaft and the countershafts, as may be seen in U.S. Pat. No. 4,735,109, assigned to the assignee of the present invention and incorporated herein by reference. A typical compound change gear transmission has two countershafts in the main section, and therefore, there is a reverse idler gear and shaft arrangement associated with each countershaft.

The typical compound change gear transmission with which the present invention is especially advantageous has a housing including an intermediate wall portion separating the transmission front section from the rear section, either of which may comprise the "main transmission section", and either of which may comprise the "auxiliary transmission section". Received within the intermediate wall portion, within suitable bearings, are the rearward ends of the front countershafts and the forward ends of the rear countershafts. Adjacent the intermediate wall portion, the transmission case or housing typically includes another wall portion through which extends the reverse idler shaft. As is illustrated somewhat schematically in above-incorporated U.S. Pat. No. 4,735,109, and as will be illustrated and described herein subsequently, the reverse idler gear has been mounted on the reverse idler shaft in a cantilevered manner.

The reverse idler gear mounting arrangement described above is in widespread commercial use, and has been generally satisfactory in operation. However, the prior art arrangement has certain disadvantages relating to the number of parts required, and the consequent cost of manufacture and assembly. Furthermore, with the prior art arrangement, it has been necessary to utilize only straight spur gears for the reverse idler gears (and therefore, also for the associated gears), in order to avoid the compound forces on the reverse idler gear and shaft which would result from the use of helical gearing. The prior art cantilevered reverse idler shaft has not been strong enough to retain the idler gear on the shaft when subjected to such compound forces.

SUMMARY OF THE INVENTION

Accordingly, it is an object of the present invention to provide an improved gear mounting arrangement which requires fewer parts, and therefore, has a lower cost of manufacture and assembly.

It is another object of the present invention to provide an improved gear mounting arrangement which facilitates the use of helical gears, while providing the ability to withstand the resulting compound forces.

The above and other objects of the invention are accomplished by the provision of a compound change gear transmission comprising a change gear main transmission section connected in series with an auxiliary transmission section including an auxiliary section countershaft. The transmission comprises housing means including an intermediate wall portion disposed axially between the main and auxiliary transmission sections, and a shaft support portion disposed within the main transmission section and axially spaced-apart from the intermediate wall portion. A gear member is disposed axially between the intermediate wall portion and the shaft support portion, and is supported for rotation relative to the housing means by a shaft means, the shaft means and the auxiliary section countershaft being generally coaxial.

The transmission is characterized by the shaft support portion and the intermediate wall portion defining first and second aligned bores, respectively. The shaft means comprises a shaft member defining first and second axial end portions disposed within the first and second shaft bores, respectively. The shaft member and one of the first and second shaft bores cooperate to define means for retaining the shaft member relative to said shaft bores. The shaft member defines passage means operable to permit flow of lubrication fluid from the first end portion of the shaft member to the auxiliary section countershaft.

In accordance with a further aspect of the present invention, the gear member is mounted for rotation about the shaft member and the shaft member outer surface defines an outer bearing surface. The gear member includes a set of bearing members disposed about the inner periphery of the gear member, and the outer surface of the shaft member comprises an inner race for the set of bearing members.

BRIEF DESCRIPTION OF THE DRAWINGS

FIG. 3 is a fragmentary, axial cross-section, similar to FIG. 2, illustrating the gear mounting arrangement of the present invention.

DESCRIPTION OF THE PREFERRED EMBODIMENTS

Figure 1:
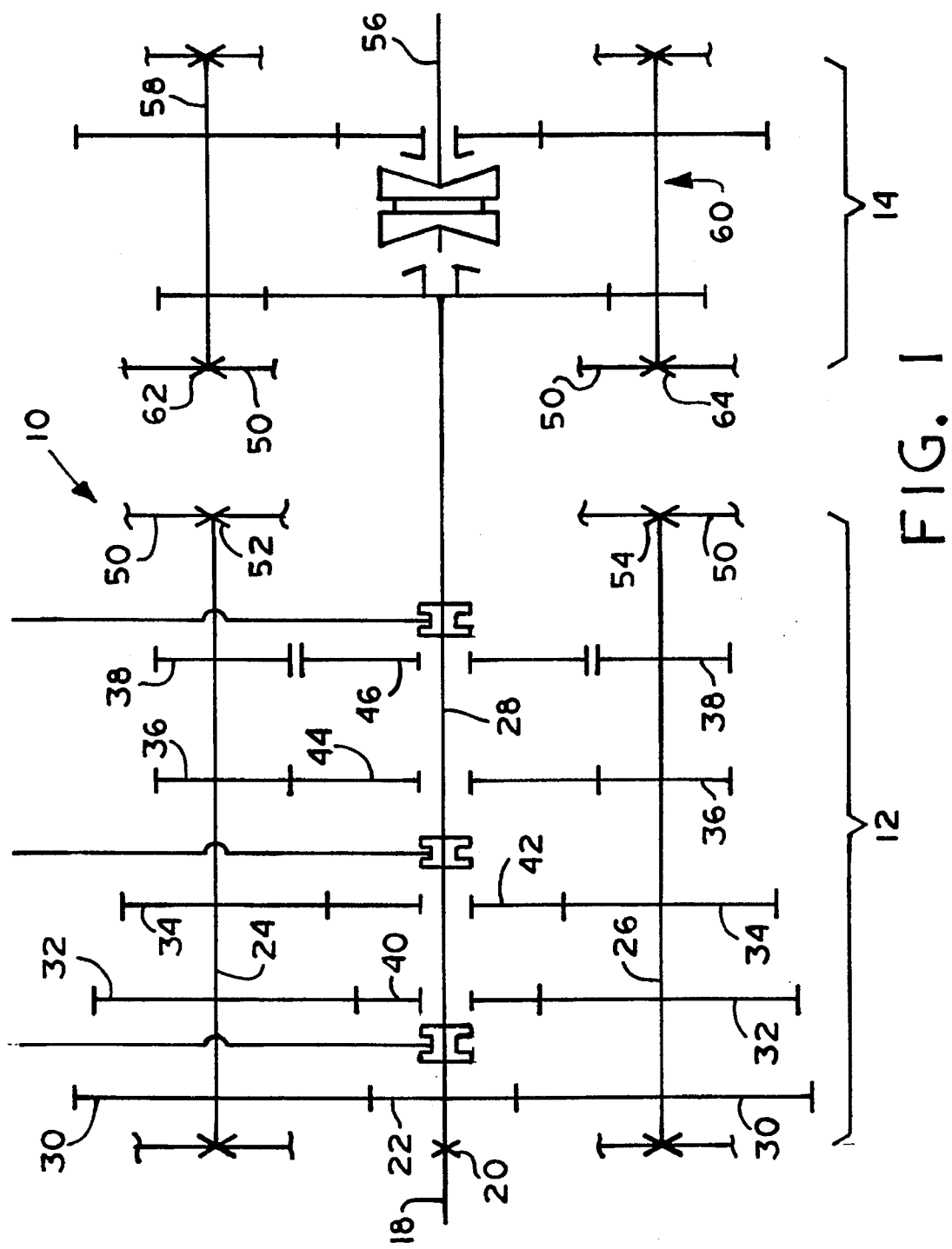
FIG. 1 is a schematic illustration of a compound change gear transmission of the type with which the present invention may be utilized.

Certain terminology will be used in the following description for convenience in reference only, and will not be limiting. Words such as "upward", "downward", "rightward", and "leftward" will be understood to designate directions in the drawings to which reference is made. The words "forward" and "rearward" will refer, respectively, to the front and rear ends of the transmission, as it is conventionally mounted in a vehicle being, respectively, to the left and the right in the drawing figures. The words "inward" and "outward" will refer to directions toward and away from, respectively, the geometric center of the transmission or designated parts thereof. Such terminology will include the words above-mentioned, derivatives thereof, and words of similar import.

Referring now primarily to FIG. 1, there is illustrated an eight forward speed, compound transmission, generally designated 10. The transmission 10 comprises a main section 12 connected in series with an auxiliary section 14, each of which has a plurality of selectable speeds or power paths. The main and auxiliary sections are both suitably enclosed by a conventional housing means 16 (shown only in FIG. 2).

The transmission 10 includes an input shaft 18 supported adjacent its rearward end by a bearing 20, and is provided with an input gear 22 non-rotatably connected thereto, such as by a set of splines. The input gear 22 simultaneously drives a plurality of main section countershafts 24 and 26 at equal speeds. Typically, the countershafts 24 and 26 are disposed on diametrically opposite sides of a mainshaft 28, with the mainshaft 28 being coaxially aligned with the input shaft 18.

Each of the main section countershafts 24 and 26 is provided with an identical grouping of countershaft gears 30, 32, 34, 36, and 38 thereon, which groupings form pairs of gears of identical size and number of teeth, and disposed on diametrically opposite sides of the mainshaft 28. As may best be seen in above-incorporated U.S. Pat. No. 4,735,109, countershaft gears 36 and 38 may be defined by involute spines formed directly on the main section countershafts 24 and 26.

A plurality of main section mainshaft drive gears 40, 42, 44, and 46 surround the mainshaft 28, and are selectably clutchable thereto, one at a time, by sliding clutch collars, as is well known in the art. The main section mainshaft gears 40, 42, and 44 encircle the mainshaft 28, are in continuous meshing engagement with, and are floatingly supported by, the diametrically opposite pairs of countershaft gears 30, 32, and 34, respectively, in a manner which is now well known to those skilled in the art, and is explained in greater detail in U.S. Pat. No. 3,105,395, assigned to the assignee of the present invention and incorporated herein by reference.

Figure 2:
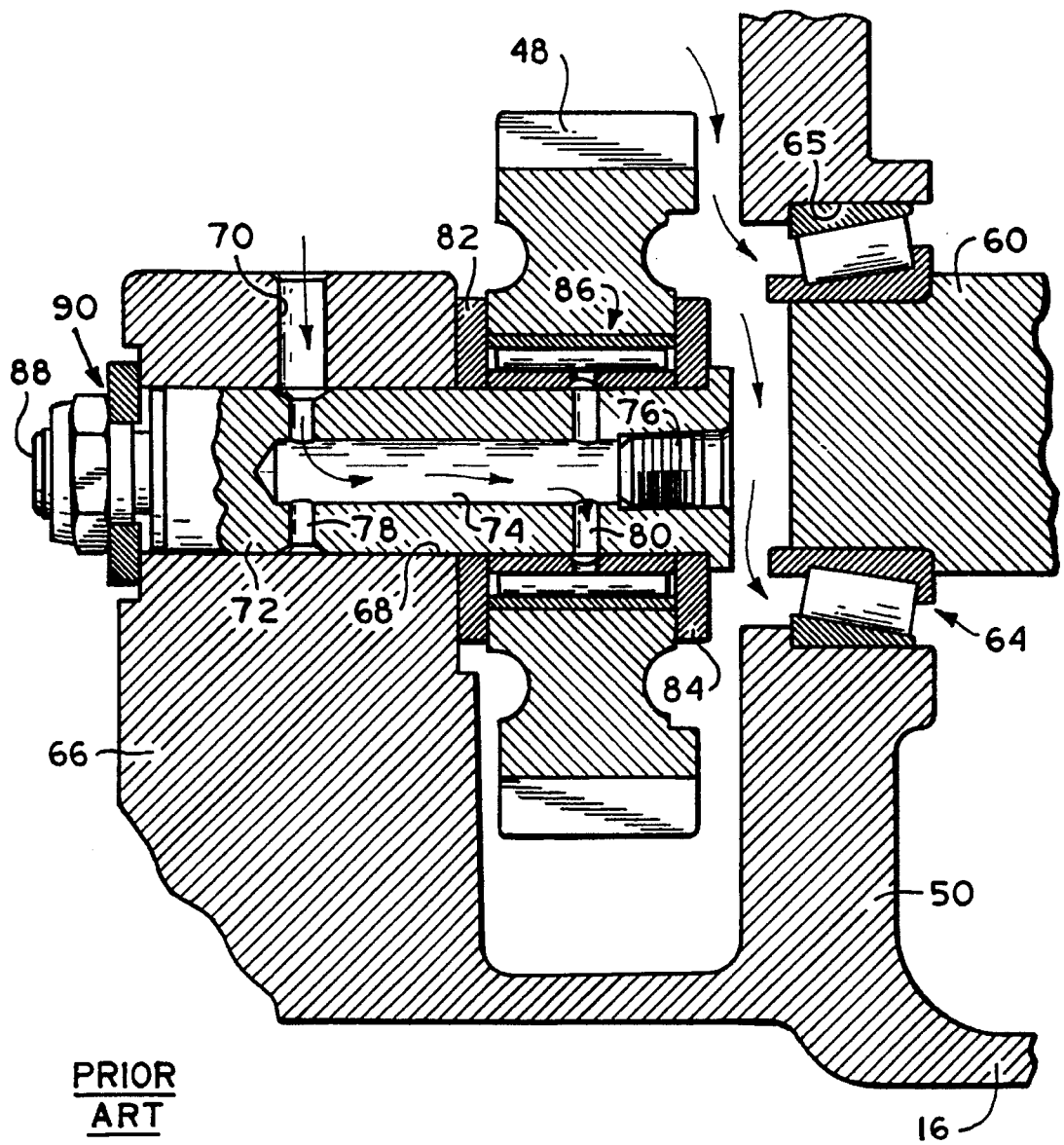
FIG. 2 is a fragmentary, axial cross-section, illustrating the "PRIOR ART" idler gear mounting arrangement which is in commercial usage.

The mainshaft drive gear 46 is the reverse gear, and is in continuous meshing engagement with the pair of countershaft gears 38 by means of conventional, intermediate reverse idler gears 48 (shown only in FIGS. 2 and 3). The forwardmost countershaft gears 30 are continually meshed with, and driven by, the input gear 22, thus causing simultaneous rotation of the countershafts 24 and 26, whenever the input shaft 18 is rotatably driven.

The housing means 16 includes an intermediate wall portion 50, which is "duplicated" in the schematic of FIG. 1, although those skilled in the art will understand that there is typically only a single intermediate wall. The intermediate wall portion 50 supports the rearward end of the main section countershafts 24 and 26, by means of suitable bearings 52 and 54, respectively.

The auxiliary section 14 receives the mainshaft 28 extending axially thereinto, which is coaxially arranged with an output shaft 56. The auxiliary section 14 further includes a plurality of auxiliary section countershafts 58 and 60, each having an identical grouping of countershaft gears thereon, which will not be described further herein. As is known to those skilled in the art, and as is illustrated in greater detail in above-incorporated U.S. Pat. No. 3,105,395, the main section countershafts 24 and 26 are displaced about 90 degrees from the auxiliary section countershafts 58 and 60, although appearing in the schematic of FIG. 1 to be aligned. The auxiliary section countershafts 58 and 60 are supported in the intermediate wall portion 50 by means of suitable bearings 62 and 64, respectively. As is shown in both FIGS. 2 and 3, the bearings 64 are disposed within an opening 65 defined by the intermediate wall portion 50. Further details of the construction and operation of the transmission 10 are described in greater detail in the above-incorporated patents, are now well known to those skilled in the art, and are not especially relevant to the present invention and will not be included herein.

PRIOR ART

Referring now primarily to FIG. 2, there is illustrated the "PRIOR ART" arrangement for cantilevered mounting of the reverse idler gears 48. In the PRIOR ART arrangement, the housing means 16 includes a shaft support portion 66 defining an axially-extending bore 68, and a radially-extending bore 70. Disposed within the axial bore 68 is a reverse idler shaft 72, which defines an axially-extending lubrication passage 74, closed at its rearward end by a threaded plug 76. The shaft 72 further defines forward and rearward radial lubrication passages 78 and 80, respectively.

Disposed on axially opposite sides of the reverse idler gear 48 are forward and rearward thrust washers 82 and 84, respectively. Disposed radially between the idler shaft 72 and the gear 48 is a needle bearing set 86, including both an inner race and an outer race, the inner race being disposed about the shaft 72. Typically, the inner race of the bearing set 86 is slightly longer, axially, than the gear 48, thus serving as a spacer, and permitting the gear 48 to rotate freely relative to the washers 82 and 84.

The idler shaft 72 has, on its forward end, a reduced-diameter threaded portion 88, and a nut and washer assembly 90 engages the portion 88 and draws the shaft 72 forward, with the washers 82 and 84 and the inner race of the bearing set 86 held tightly together, axially.

Lubrication of the needle bearing set 86 is accomplished by lubricant "splash" within the housing means 16, a portion of which enters the radial bore 70 and flows radially inward through the upwardly-extending radial lubrication passage 78 (see arrows). The lubricant then flows rearwardly through the axial lubrication passage 74, then radially outward through the downwardly-extending radial lubrication passage 80, and through openings in the bearing inner race, then into the bearings.

A portion of the lubricant "splash" flows radially outward, rearwardly of the reverse idler gear 48, and passes along the forward surface of the intermediate wall portion 50, with a portion of the lubrication fluid splashing or somehow passing through, axially, the bearings 64 which support the forward end of the auxiliary section countershaft 60 (and also flowing through the bearings 62, which support the forward end of the auxiliary countershaft 58).

INVENTION

Referring now primarily to FIG. 3, the mounting arrangement for the reverse idler gear 48, according to the present invention, will be described. The shaft support portion 66 defines an axially-extending bore 92, which typically would be somewhat larger than the bore 68 of the "PRIOR ART", for reasons which will become apparent subsequently. The intermediate wall portion 50 defines a rearward shaft support portion 94 which, in turn, defines an axially-extending bore 96. The bores 92 and 96 are aligned (coaxial), and disposed therein is a reverse idler shaft 98. The shaft 98 is preferably made from a thick-walled tubing, and thus defines an axially-extending lubricant passage 100, which is open at the rearward end of the idler shaft 98. The forward end of the shaft 98 defines a threaded opening, into which is threaded an appropriate fluid fitting 102, illustrated in FIG. 3 as being connected to a small fluid conduit 104, the function of which will be described subsequently. Surrounding the idler shaft 98, and disposed axially between the gear 48 and the shaft support portion 66 is a spacer member 106, which defines one or more L-shaped lubricant passages 108. The rearward face of the support portion 66 defines a radial slot 110, which receives the forward end of an anti-rotation pin 112, the rearward end of the pin 112 being received tightly within an opening defined by the spacer member 106.

Disposed axially between the idler gear 48 and the rearward shaft support portion 94 is a spacer member 114. As may best be seen in the lower half of the spacer 114 in FIG. 3, the adjacent portion of the support portion 94 defines a slot 116, and the spacer member 114 has an anti-rotation tab 118, deformed out of the plane of the spacer member 114, and received in the slot 116.

Disposed radially between the idler shaft 98 and the idler gear 48 is a needle bearing set 120. In accordance with one aspect of the present invention, the outer surface of the shaft 98 is ground in such a manner that the individual bearings can roll over the outer surface of the shaft 98, without the need for an inner race. Similarly, the needles (rollers) roll within the I.D. of the idler gear 48, such that no outer race is required, thus substantially reducing the complexity and cost of the bearing set upon which the idler gear 48 is mounted. This feature of the invention is made possible in part by the fact that, unlike the "PRIOR ART", the rollers are not rolling over holes in the surface of the shaft, which would be detrimental to bearing life. Furthermore, without the need for separate race members, the bearing rollers can have a larger diameter, thus enabling the bearing set to handle the greater loads associated with the use of helical gearing. Finally, without the need for separate race members, the idler shaft 98 can have a larger diameter, thus making the shaft substantially stronger.

With the arrangement of the present invention, bearing races are not needed to serve as spacers between the spacer members 106 and 114 on either side of the idler gear, as in the "PRIOR ART". Lubrication of the bearing set 120 occurs as the result of lubricant "splash", which flows into the L-shaped lubricant passages 108, then flows rearwardly through the bearings (see arrows in FIG. 3).

In regard to the assembly of the mounting arrangement of the present invention, it should be noted that a forward end 99 of the idler shaft 98 is slightly tapered. Prior to the installation of the auxiliary section countershaft 60 and its bearing set 64, the idler shaft 98 is installed by inserting its tapered, forward end 99 into the bore 96, from the rearward end thereof, then moving the shaft 98 forwardly while holding in place first the spacer member 114, then the idler gear 48, with the bearing set 120 disposed therein, then finally, the spacer member 106. The forward, tapered end of the idler shaft 98 then enters the bore 92 and the shaft 98 is moved even further forward until the tapered forward end 99 is almost to the position shown in FIG. 3.

The outer surface of the shaft 98 is provided, at its rearward end, with a set of serrations 122. When the shaft is in a position such that the serrations 122 are disposed just rearwardly of the support portion 94, it is then necessary to use some sort of appropriate tool to force the shaft 98 into the position shown in FIG. 3, wherein the serrations 122 engage and deform the bore 96. The primary function of the serrations 122 is to retain the idler shaft 98 within the bores 92 and 96, preventing any substantial movement therein, axially or rotationally. Within the scope of the present invention, various other retaining means could be used, such as a press-fit, a lock-pin, a key and keyway, or any other reasonably equivalent arrangement.

Once the shaft 98 is in the position shown, the fluid fitting 102 is threaded into place, and is connected to the fluid conduit 104. The other end of the fluid conduit 104 may be connected to any suitable source of lubrication fluid, such as an on-board lubricant pump 105. It is known in change gear transmissions of the type shown schematically in FIG. 1 to drive a lubricant pump off of one of the main section countershafts 24 or 26, although those skilled in the art will understand that the present invention is not so limited.

After assembly of the reverse idler gear 48 and idler shaft 98, the auxiliary section countershafts and bearings are installed. It is one significant benefit of the invention that the configuration of the idler shaft 98 facilitates the connection thereto of a source of lubrication fluid and, as may be seen by the arrows in FIG. 3, lubricant flows from the source, through the fluid conduit 104, then rearwardly through the lubricant passage 100. Lubricant which leaves the shaft 98, then flows into the chamber defined just ahead of the auxiliary section countershaft 60. Preferably, the countershaft 60 and the idler shaft 98 are generally coaxial, i.e., there is sufficient overlap of the adjacent ends of the shafts that, at least some lubricant flowing out of the lubricant passage 100 will inherently be in communication with the bearings 64. As may be seen by the arrows in FIG. 3, in the subject embodiment, a major portion of the lubricant flowing out of the passage 100 will flow through the bearings 64. The remainder of the fluid will flow forwardly (left in FIG. 1) through an opening between the intermediate wall portion 50 and the shaft support portion 94. However, that opening can be made smaller or larger, depending upon the perceived lubrication needs of the countershaft bearings 64, and if that opening is made smaller, a greater amount of lubrication fluid will be forced to flow through the bearings. In other words, one of the benefits of the invention is the ability to put more lubrication flow where it is needed.

In the event maintenance is required which involves removing the idler gear 48 and its bearing set 120, the idler shaft 98 may be merely "tapped" out (i.e., removed rearwardly), and then after the maintenance is complete, the shaft may be reinserted in the same manner as the initial installation. Both the removal and the reinstallation may be accomplished without any special tools or equipment. Of course, such removal of the idler shaft 98 must be preceded by removal of the respective auxiliary section countershaft 60, as well as its bearing set 64, which represents another reason for the idler shaft 98 and the countershaft 60 being at least "generally coaxial".

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A compound change gear transmission comprising a change gear main transmission section connected in series with an auxiliary transmission section including an auxiliary section countershaft; said transmission comprising housing means including an intermediate wall portion disposed axially between said main and auxiliary transmission sections, and a forward shaft support portion disposed within said main transmission section, and axially spaced-apart from said intermediate wall portion; a gear member being disposed axially between said intermediate wall portion and said forward shaft support portion and supported for rotation relative to said housing means by a shaft means, said shaft means and said auxiliary section countershaft being generally coaxial, characterized by:

(a) a rearward shaft support portion disposed axially adjacent said intermediate wall portion, and axially between said forward shaft support portion and said intermediate wall portion;

(b) said forward and rearward shaft support portions defining first and second aligned shaft bores, respectively;

(c) said shaft means comprising a shaft member defining first and second axial end portions, disposed within said first and second shaft bores, respectively;

(d) said shaft member and one of said first and second shaft bores cooperating to define means for retaining said shaft member relative to said shaft bores; and (e) said shaft member defining passage means operable to permit flow of lubrication fluid from said first end portion of said shaft member to said auxiliary section countershaft.

2. A compound change gear transmission as claimed in claim 1, further characterized by said gear member being mounted for rotation about said shaft member, and said outer surface of said shaft member defining a bearing surface for said gear member.

3. A compound change gear transmission as claimed in claim 2, further characterized by said gear member including a set of bearing members disposed about the inner periphery of said gear member, said outer surface of said shaft member comprising an inner race for said set of bearing members.

4. A compound change gear transmission as claimed in claim 1, further characterized by said main transmission section comprises a front section, and said auxiliary transmission section comprises a rear section, said front section including an input shaft and said rear section including an output shaft.

5. A compound change gear transmission as claimed in claim 4, further characterized by said shaft support portion being disposed forwardly of said intermediate wall portion, and said shaft member being assembled by moving said shaft member forwardly, said first axial end portion of said shaft member first passing through said second shaft bore, then into said first shaft bore.

6. A compound change gear transmission as claimed in claim 5, further characterized by said shaft member being disassembled by moving said shaft member rearwardly, said first axial end portion of said shaft member first being removed from said first shaft bore, then passing through said second shaft bore.

7. A compound change gear transmission as claimed in claim 1, further characterized by said intermediate wall portion defining an opening, a set of bearings being disposed within said opening and receiving and rotatably supporting one end of said auxiliary section countershaft.

8. A compound change gear transmission as claimed in claim 7, further characterized by said opening being disposed immediately axially adjacent said second shaft bore, and being generally coaxial therewith.

9. A compound change gear transmission as claimed in claim 8, further characterized by said transmission including means operable to provide a flow of lubrication fluid, and further including means operable to communicate said lubrication fluid from said providing means to said first axial end portion of said shaft member.

10. A compound change gear transmission as claimed in claim 9, further characterized by said shaft member comprising a hollow member, said first axial end portion being adapted to receive said means operable to communicate said lubrication fluid, said lubrication fluid flowing through said hollow shaft member, and through said set of bearings supporting said one end of said auxiliary section countershaft.

11. A compound change gear transmission as claimed in claim 1, further characterized by said means for retaining said shaft member comprises one of said first and second axial end portion of said shaft member defining, about its circumference, a pattern of retention surfaces disposed to engage and deform its respective shaft bore.

12. A compound change gear transmission as claimed in claim 1, further characterized by spacer means disposed about said shaft member and disposed axially between said gear member and said shaft support portion, said spacer means and said shaft support portion including means operable to prevent rotation of said spacer means relative to said shaft support portion.

13. A compound change gear transmission as claimed in claim 12, further characterized by said spacer means defining fluid passage means, whereby lubrication fluid disposed about said spacer means is operable to pass through said passage means and flow between the inner periphery of said gear member and said outer surface of said shaft member.

* * * * *